United States Patent
Nakajima et al.

(10) Patent No.: US 10,451,827 B2
(45) Date of Patent: Oct. 22, 2019

(54) OPTICAL CONNECTOR

(71) Applicant: SONY CORPORATION, Tokyo (JP)

(72) Inventors: Yasuhisa Nakajima, Kanagawa (JP); Masanari Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/406,393

(22) Filed: May 8, 2019

(65) Prior Publication Data

US 2019/0265424 A1    Aug. 29, 2019

Related U.S. Application Data

(63) Continuation of application No. 15/539,250, filed as application No. PCT/JP2015/084778 on Dec. 11, 2015, now Pat. No. 10,324,265.

(30) Foreign Application Priority Data

Jan. 7, 2015 (JP) ................. 2015-001578

(51) Int. Cl.
*G02B 6/42* (2006.01)
*G02B 6/38* (2006.01)
*H04B 10/25* (2013.01)
*H04B 10/60* (2013.01)
*G02B 6/04* (2006.01)
(Continued)

(52) U.S. Cl.
CPC ......... *G02B 6/4292* (2013.01); *G02B 6/3885* (2013.01); *G02B 6/4249* (2013.01); *H04B 10/2503* (2013.01); *G02B 6/04* (2013.01); *G02B 6/32* (2013.01); *G02B 6/36* (2013.01); *G02B 6/43* (2013.01); *H04B 10/25* (2013.01); *H04B 10/60* (2013.01)

(58) Field of Classification Search
None
See application file for complete search history.

(56) References Cited

U.S. PATENT DOCUMENTS

2006/0093272 A1   5/2006   Fenwick et al.
2010/0080563 A1   4/2010   Difonzo et al.
(Continued)

FOREIGN PATENT DOCUMENTS

JP        2012-504312 A        2/2012

OTHER PUBLICATIONS

Jul. 19, 2018, European Search Report issued for related EP Application No. 15876988.5.
(Continued)

*Primary Examiner* — Jerry Rahll
(74) *Attorney, Agent, or Firm* — Paratus Law Group, PLLC

(57) ABSTRACT

An optical connector according to the present disclosure includes: optical transmission paths that have end faces aligned in a predetermined region, and transmit optical signals. The optical transmission paths correspond to transmission channels or reception channels. The optical transmission paths of the transmission channels are distributed and arranged on a periphery of the predetermined region as compared with a case where the optical transmission paths of the transmission channels are concentrated and arranged at a center of the predetermined region. This configuration can increase an output of an optical signal, and make it possible to improve transmission quality at a low cost while improving a safety standard.

13 Claims, 7 Drawing Sheets

(51) Int. Cl.
  *G02B 6/43* (2006.01)
  *G02B 6/36* (2006.01)
  *G02B 6/32* (2006.01)

(56) References Cited

U.S. PATENT DOCUMENTS

2011/0103803 A1   5/2011   Kolesar
2012/0183302 A1   7/2012   McColloch et al.
2012/0189259 A1   7/2012   Manes
2014/0205238 A1   7/2014   Kuo

OTHER PUBLICATIONS

Oct. 9, 2018, Chinese Office Action issued for related CN Application No. 201580071874.9.

FIG. 5

| TERMINAL ARRANGEMENT OF Tx/Rx AT OPTICAL CONNECTOR END ○: Tx ●: Rx | Class 1 DEFAULT VALUE AEL (/ch) | MAXIMUM OUTPUT WHEN APR IS ACTIVATED (/ch) |
|---|---|---|
| (1) CASE WHERE Tx ARE CONCENTRATED — 400 | 0.4 mW | 2.5 mW |
| (2) CASE WHERE Tx ARE DISTRIBUTED IN HORIZONTAL DIRECTION | 0.6 mW | 3.7 mW |

BLOCKING TIME: 0.01 (sec)

OPTICAL CONNECTOR

CROSS REFERENCE TO PRIOR APPLICATION

This application is a continuation of U.S. patent application Ser. No. 15/539,250 (filed on Jun. 23, 2017), which is a National Stage Patent Application of PCT International Patent Application No. PCT/JP2015/084778 (filed on Dec. 11, 2015) under 35 U.S.C. § 371, which claims priority to Japanese Patent Application No. 2015-001578 (filed on Jan. 7, 2015), which are all hereby incorporated by reference in their entirety.

TECHNICAL FIELD

The present disclosure relates to an optical connector.

BACKGROUND ART

Optical data transmission has been finding uses with a sharp increase in the amount of communication in recent years. The optical data transmission is, however, used chiefly for data transmission of infrastructure backbone systems, and data transmission between data servers, which transmit a large amount of data, but has yet to gain widespread use among consumers. Class 2 or class 3 for high output lasers in the safety standard (JIS C6802) for laser beams is therefore applied under the control of laser managers. The structures of devices prioritize only reliable connections to optical cables, and are actually difficult for general users to easily use.

Patent Literature 1 proposes a laser beam blocking method for reducing the hazard degree of an optical fiber disconnected from an optical connector terminal with respect to the human body.

CITATION LIST

Patent Literature

Patent Literature 1: JP 3938691B

DISCLOSURE OF INVENTION

Technical Problem

It is necessary to satisfy class 1 or class 1M in the safety standard (JIS C6802) for laser beams, with which the laser beams have to comply when optical cables are disconnected from the connector terminals, while making the connector structures easier to mount for consumer use. However, if the laser beam output levels are set that satisfy this safety plan, the loss over the optical cable length or at the connector terminal unit can lower the optical output and result in insufficient transmission quality.

The proposal of Patent Literature 1 above mentions the laser beam blocking method for minimizing influence on the human body, but is not a proposal to improve the transmission quality. The proposal of Patent Literature 1 above takes nothing into consideration about improving the transmission quality.

It is then desired to secure an optical output and improve transmission quality while satisfying a safety standard.

Solution to Problem

According to the present disclosure, there is provided an optical connector including: optical transmission paths that have end faces aligned in a predetermined region, and transmit optical signals. The optical transmission paths correspond to transmission channels or reception channels. The optical transmission paths of the transmission channels are distributed and arranged on a periphery of the predetermined region as compared with a case where the optical transmission paths of the transmission channels are concentrated and arranged at a center of the predetermined region.

Advantageous Effects of Invention

As described above, according to the present disclosure, it is possible to secure an optical output and improve transmission quality while satisfying a safety standard.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a schematic diagram illustrating default values in "class 1" of a laser beam obtained from Equation 1 for two arrangement examples of transmission channels Tx and reception channels Rx at an end of an optical connector 300.

MODE(S) FOR CARRYING OUT THE INVENTION

Figure 1:
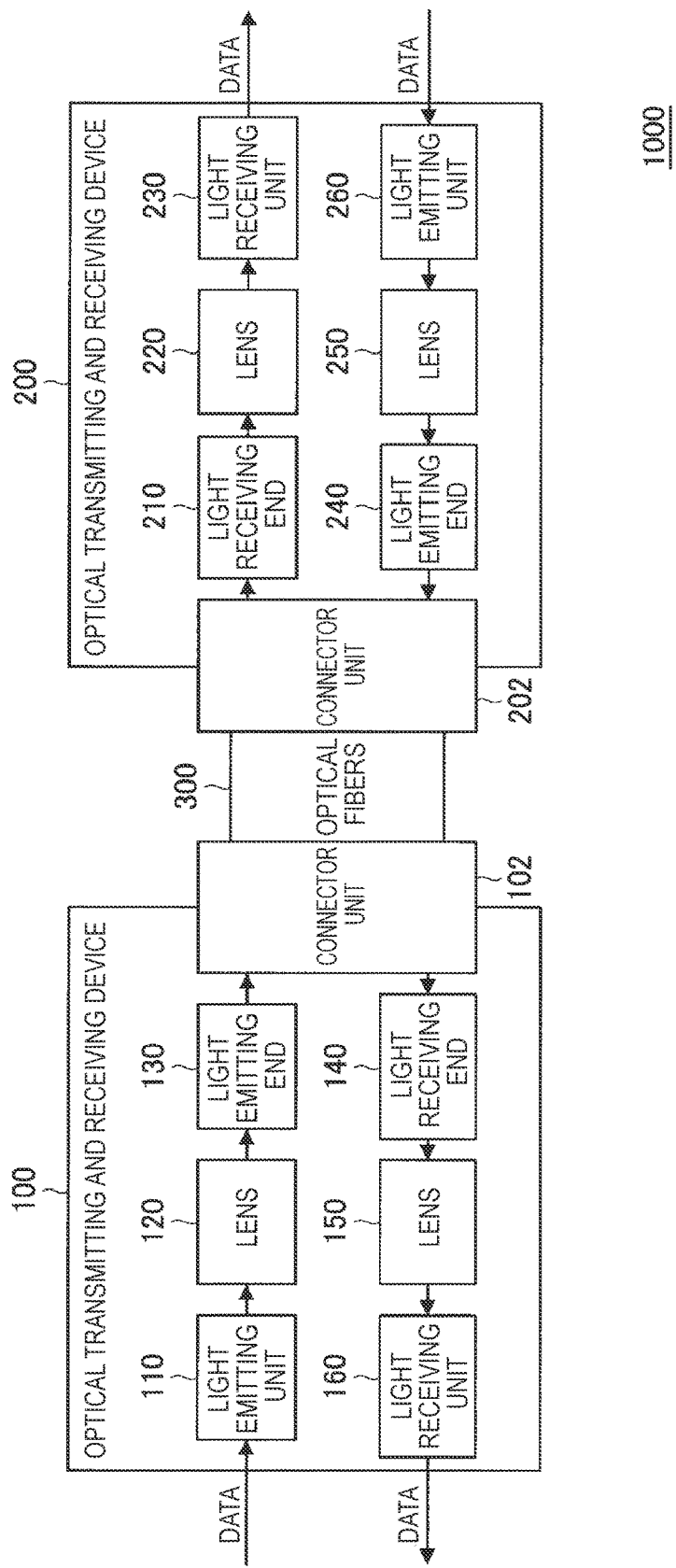
FIG. 1 is a schematic diagram illustrating a configuration of an optical fiber system 1000 according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.
1. Configuration of Optical Fiber System
2. Optical Loss on Transmission Path
3. Safety Standards for Laser Products
4. Channel Arrangement of Connector Unit
5. Modification of the Present Embodiment

1. Configuration of Optical Fiber System

First, the configuration of an optical fiber system 1000 according to an embodiment of the present disclosure will be described with reference to FIG. 1. As illustrated in FIG. 1, the system according to the present embodiment includes an optical transmitting and receiving device 100 and an optical transmitting and receiving device 200. The optical transmitting and receiving device 100 includes a connector unit 102, and the optical transmitting and receiving device 200 includes a connector unit 202. The connector unit 102 of the optical transmitting and receiving device 100 is connected to the connector unit 202 of the optical transmitting and receiving device 200 by an optical cable 300.

Further, the optical transmitting and receiving device 100 includes a light emitting unit 110 for optical data, a lens 120, a light emitting end 130, a light receiving end 140, a lens 150, and a light receiving unit 160 for optical data. Similarly, the optical transmitting and receiving device 200 includes a light receiving end 210, a lens 220, a light receiving unit 230, a light emitting end 240, a lens 250, and a light emitting unit 260 for optical data.

Although FIG. 1 illustrates that the optical transmitting and receiving device 100 and the optical transmitting and receiving device 200 each include a single light emitting unit, a single lens, and a single light emitting end for the optical cable 300 including a single optical transmission path, the optical cable 300 includes multiple optical transmission paths (optical fibers 400). The optical transmitting and receiving device 100 and the optical transmitting and receiving device 200 therefore include multiple light emitting units, multiple lenses, and multiple light emitting ends in accordance with the number of optical transmission paths (the number of channels). Similarly, FIG. 1 illustrates that the optical transmitting and receiving device 100 and the optical transmitting and receiving device 200 each include a single light receiving end, a single lens, and a single light receiving unit for the optical cable 300 including a single optical transmission path, the optical cable 300 includes multiple optical transmission paths. The optical transmitting and receiving device 100 and the optical transmitting and receiving device 200 therefore include multiple light receiving ends, multiple lenses, and multiple light receiving units in accordance with the number of optical transmission paths.

Further, the lens 120 may be arranged at the position of the light emitting end 130, and the lens 250 may be arranged at the position of the light emitting end 240 in FIG. 1. The light emitting end 130 and the light emitting end 240 each represent an interface on which light is emitted toward the connector units 102 and 202. Further, the lens 150 may be arranged at the position of the light receiving end 140, and the lens 220 may be arranged at the position of the light receiving end 210. The light receiving end 140 and the light receiving end 210 each represent an interface on which light from the connector units 102 and 202 is received.

2. Optical Loss on Transmission Path

Figure 2:
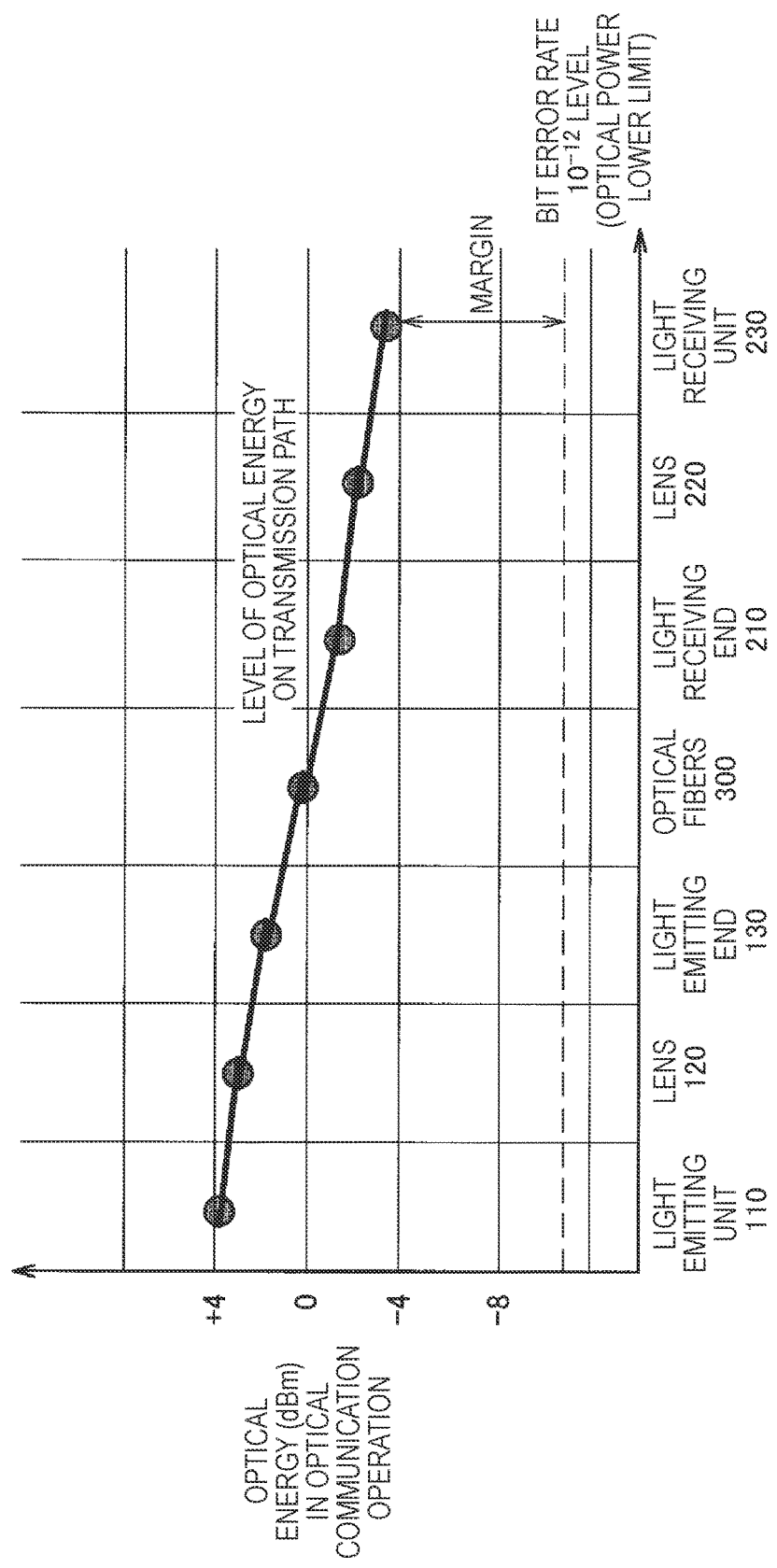
FIG. 2 is a schematic diagram illustrating an example of optical loss on a transmission path in the optical fiber system.

FIG. 2 illustrates an example of optical loss on a transmission path (the light emitting unit 110→the lens 120→the light emitting end 130→the optical cable 300→the light receiving end 210→the lens 220→the light receiving unit 230) in the optical fiber system 1000. The optical energy in the light emitting unit 110 for optical data is reduced in the lens unit 120 and the light emitting end 130 of the optical transmitting and receiving device 100. Moreover, the optical energy is also reduced in the optical cable 300 in proportion to the length thereof. Moreover, the optical energy is also reduced in the light receiving end 210 and the lens 220 of the optical transmitting and receiving device 200, and the reduced energy reaching the light receiving unit 230 undergoes photoelectric conversion to generate desired data signals. Further, the same applies to the optical loss on a transmission path which arrives at the optical transmitting and receiving device 100 from the optical transmitting and receiving device 200 via the optical cable 300.

It is desirable that the bit error rates (BER) of video and audio data and other data transmitted in an optical cable system be less than or equal to $10^{-10}$ to $10^{-12}$. To allow the light receiving unit 230 of the optical transmitting and receiving device 200 to have optical energy with a margin exceeding the minimum value of optical energy which satisfies this BER value, the optical energy in the light emitting unit 110 of the optical transmitting and receiving device 100 has to be increased.

Cases are, however, assumed where the optical cable 300 is unplugged from the connector unit 102 of the optical transmitting and receiving device 100 and the connector unit 202 of the optical transmitting and receiving device 200, and the optical cable 300 itself is cut off. There is no denying the possibility that an increase in the optical energy in the light emitting unit 110 leads to damage to the human body, especially the retinas of eyeballs from the optical energy in such a case.

3. Safety Standards for Laser Products

"JIS C6802: Safety Standard for Laser Products" and "JIS C6803: Safety of Laser Products—Safety of Optical Fiber Communication System" are then created as laser safety standards for the purpose of preventing laser products from damaging users. To show the hazard degrees of devices in operation which are each equipped with a laser beam source, this JIS C6802 defines seven "classes" that are decided in accordance with the laser radiation exposure levels of the devices used alone.

The optical fiber systems for consumer use have to fall within "class 1" (hazard level 1) or "class IM" (hazard level IM) among these "classes." The hazard degree of "class 1" is a level at which the retinas are not damaged even if laser beams are viewed for 100 seconds with no blinks. "Class IM" is the same as "class 1," but requires a warning to be displayed that laser products can pose a hazard in a case where auxiliary optics such as loupes are used.

Figure 3:
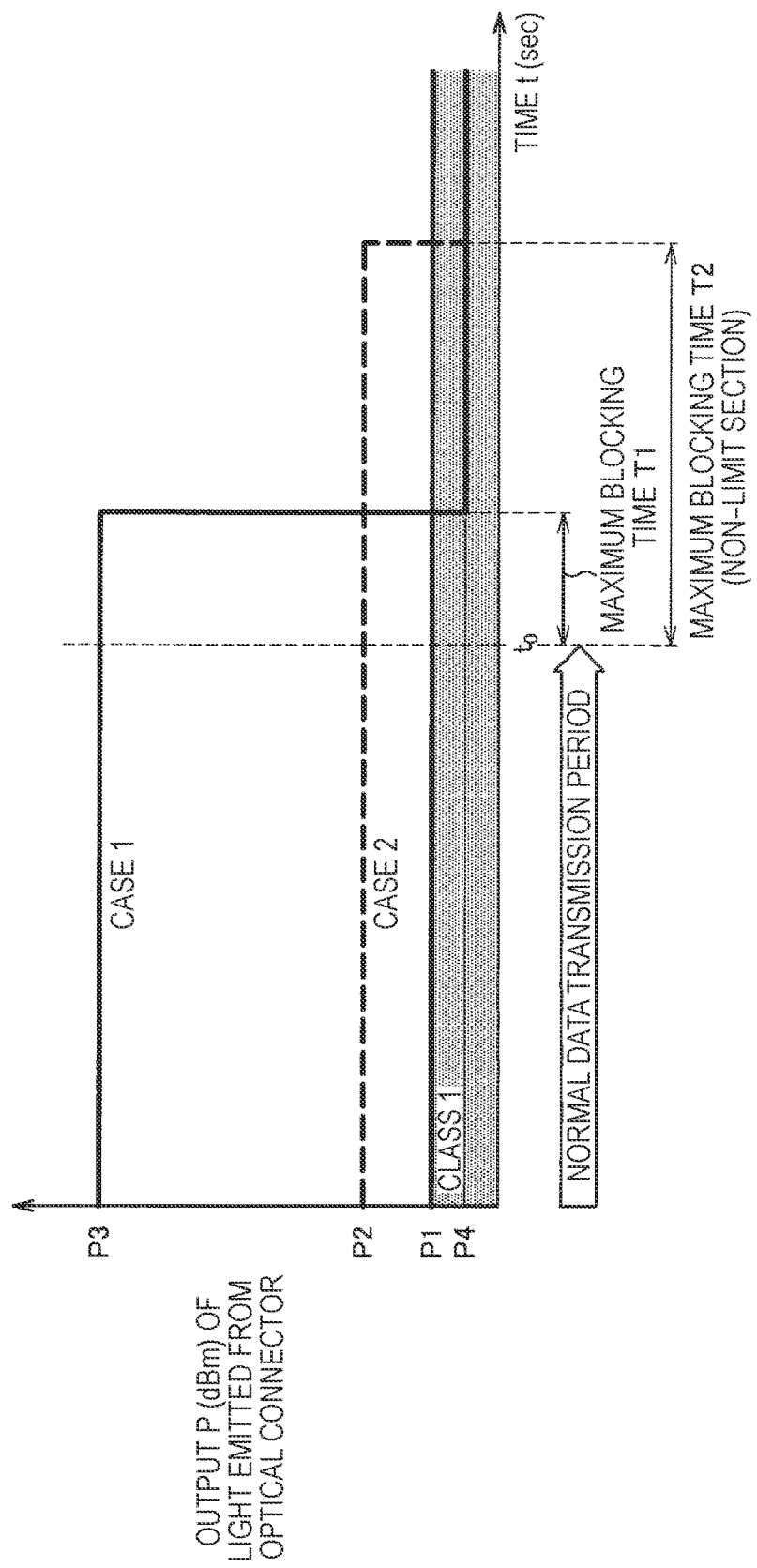
FIG. 3 is a conceptual diagram illustrating a relationship between a maximum blocking time in an automatic power reduction function activated when a cable is cut off or an optical connector is disconnected and optical energy of a laser beam.

The restricted output value of optical energy in each class is subdivided in accordance with the wavelength of a laser beam and the maximum blocking time of a laser beam. FIG. 3 is a schematic diagram illustrating the relationship between the maximum blocking time in an automatic power reduction function (which will be referred to as APR function) activated when a cable is cut off or an optical connector is disconnected and the optical energy of a laser beam.

Here, the automatic power reduction function is a function of reducing an optical output more within the maximum blocking time than within the normal data transmission period in a case where a cable is cut off or an optical connector is disconnected. With this function, the standards (JIS C6803 and IEC60825) permit data transmission at a higher optical output than that of class 1.

FIG. 3 illustrates a case 1 of the APR function with a shorter maximum blocking time, and a case 2 of the APR function with a longer maximum blocking time than that of the case 1. Class 1 limits an optical output within the normal data transmission period to P1 or less. In each of these case 1 and case 2, the power of light emitted to the outside world is defined to have a certain value or less in a case a cable is cut off or an optical connector is disconnected at time t0. The optical outputs are lowered to P4 after the maximum blocking times in both of the case 1 and case 2. A maximum blocking time T1 of the case 1 is set shorter than a maximum blocking time T2 of the case 2. If the power of light emitted to the outside world at the time to or later is lowered to the certain value or less, the case 1 having the shorter maximum blocking time T1 can have a greater optical output within the normal data transmission time than that of the case 2 having the longer maximum blocking time T1.

It is possible in the case 1 to increase an output P3 of a laser beam within the normal data transmission period because the maximum blocking time T1 is shorter. A large margin can be then obtained for satisfying the above-described BER value. Meanwhile, considerable costs are necessary to construct a circuit and the like for realizing the shorter maximum blocking time T1 and sufficiently reducing the output of a laser beam within the time.

Further, it is necessary in the case 2 to decrease an output P2 of a laser beam within the normal data transmission period because the maximum blocking time T2 is longer. The margin for satisfying the above-described BER value is also smaller. Meanwhile, fewer costs are needed by a circuit and the like for reducing a laser beam output within the maximum blocking time T2.

Further, the default value of the output of a laser beam (an accessible emission limit (which will be referred to as AEL)) in "class 1'" and "class 1M'" is calculated in Equation 1 below in a case of an optical wavelength of 700 nm to 1050 nm and an extended source. Additionally, Equation 2 to Equation 4 are the calculation formulas of $C_4$, $C_6$, and $T_2$ in Equation 1.

$$P = 7 \times 10^{-4} \ast C_4 \ast T_2^{-0.25} (W) \quad \text{(Equation 1)}$$

$$C_4 = 10^{0.002(\lambda - 700)} \quad \text{(Equation 2)}$$

$$C_6 = \alpha / 0.0015 \quad \text{(Equation 3)}$$

$$T_2 = 10 \times 10^{[(\alpha - 0.0015)/98.5]} \quad \text{(Equation 4)}$$

Figure 4:
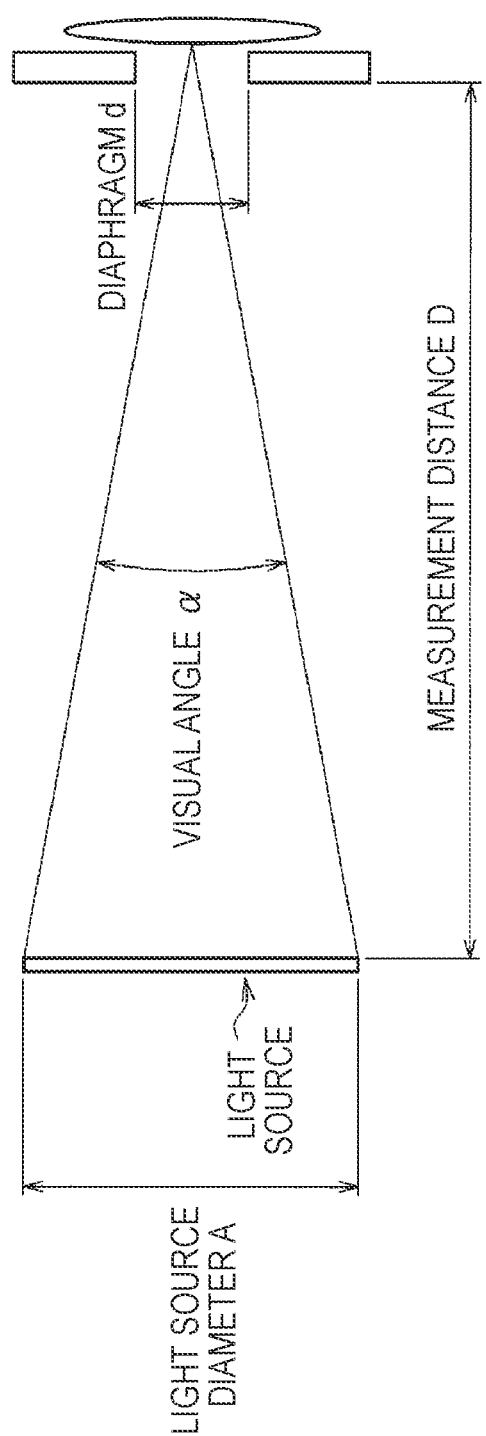
FIG. 4 is a schematic diagram illustrating a relationship between a light source diameter A, a visual angle α, and a measurement distance D.

Additionally, λ represents the optical wavelength of a light source used for transmission in Equation 1. Further, as illustrated in FIG. 4, A represents a light source diameter that serves as the light emitting end face dimension of the optical connector 300, and a represents the visual angle decided on the basis of a measurement distance D (70 mm/100 mm/2000 mm) and the light source diameter A.

According to Equation 1, an increase in the output P of a laser beam depends on the length of the wavelength λ and the light source diameter A. If the wavelength is set as a constant, it is the most efficient to increase the light source diameter. Here, in a case where light sources are distributed and arranged, the light source diameter A is the average value of the light sources in the vertical direction and the light sources in the horizontal direction.

FIG. 5 is a schematic diagram illustrating default values in "class 1" of a laser beam obtained from Equation 1 for two arrangement examples of transmission channels Tx and reception channels Rx at an end of the optical connector 300. Here is shown as an example a case where optical fiber transmission paths are assumed that have an optical wavelength of 850 nm, an optical path diameter of 0.18 mm, 12 transmission channels, 12 reception channels, an optical path length of 100 mm, and a blocking time of 0.01 seconds, and the connector unit 102 and the connector unit 202 have transmission channels (Tx) and reception channels (Rx) aligned at a pitch of 0.25 mm in the horizontal direction and at a pitch of 1 mm in the vertical direction.

Further, a case where the measurement distance D is equal to 100 mm is shown. The case of (1) where the transmission channels (Tx) are concentrated at the center, and the case of (2) where the transmission channels (Tx) are distributed in the horizontal direction are shown as disposition examples of the transmission channels Tx and the reception channels Rx.

In FIG. 5, the optical fibers 400 included in the transmission channels (Tx) and the reception channels (Rx) are made by covering a glass material transmitting light with a resin film. As an example, the optical fibers 400 each have an outermost circumferential diameter of 0.25 mm, and arranged to bring the outermost films into close contact with each other in the horizontal direction, thereby being aligned at a pitch of 0.25 mm. Additionally, a pitch of 1 mm is assumed in the vertical direction, but the optical fibers 400 may also be aligned at a pitch of 0.25 mm in the vertical direction. The optical transmission paths are not limited to the optical fibers 400, but may also be differently configured to transmit light.

As described above, the light source diameter A is the average value of the light sources in the vertical direction and the light sources in the horizontal direction in a case where light sources are distributed and arranged. Accordingly, distributing the transmission channels (Tx) makes the light source diameter A and the visual angle α larger, and then can increase the optical output.

As illustrated in FIG. 5, the case shown in (2) where the transmission channels (Tx) are distributed in the horizontal direction therefore makes the light source diameter A larger, and then can increase the output (default value) of a laser beam. This can increase the margin illustrated in FIG. 2, and allow for favorable transmission. Specifically, the case of (2) where the transmission channels (Tx) are distributed in the horizontal direction leads to a laser beam output of (0.6 mW) if the above-described condition is applied to Equation 1. Meanwhile, the case of (1) where the transmission channels (Tx) are concentrated at the center leads to a laser beam output of (0.4 mW). Further, the case of (2) where the transmission channels (Tx) are distributed in the horizontal direction leads to a maximum output of (3.7 mW) within a data transmission period in a case of a maximum blocking time of 0.01 [sec]. Meanwhile, the case of (1) where the transmission channels (Tx) are concentrated at the center leads to (2.5 mW).

The output is increased by distributing the transmission channels (Tx) in the horizontal direction as the arrangement of the optical cable of the connector units 102 and 202 on the basis of the above-described result in the present embodiment. This can increase the margin illustrated in FIG. 2, and allow for favorable transmission. Further, the use of the APR function allows for an increase in the output of a laser beam within the normal data transmission period, and makes it possible to obtain a further larger margin for satisfying the BER value.

4. Channel Arrangement of Connector Unit

Figure 6:
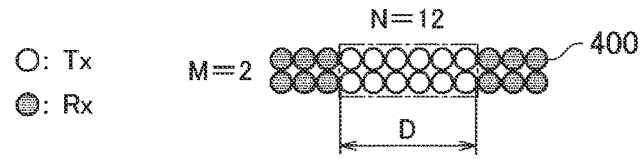
FIG. 6 is a schematic diagram illustrating an arrangement example of optical fibers of transmission channels (Tx) and reception channels (Rx) of a connector unit including optical paths of twelve transmission channels and twelve reception channels, namely 24 channels in total.

FIG. 6 illustrates an arrangement example of the optical fibers 400 of the transmission channels (Tx) and the reception channels (Rx) of the connector unit 102 and the connector unit 202 including optical paths of twelve transmission channels and twelve reception channels, namely 24 channels in total. Connectors for consumer use are required to be small in size because the connectors are mounted on devices such as mobile terminals. In the arrangement example, the thickness in the vertical direction is decreased as much as possible by aligning twelve columns (N=12) in the horizontal direction and two rows (M=2) in the vertical direction as a terminal alignment of 24 channels in total. Further, in this arrangement example, the sizes of the connector units 102 and 202 are decreased as much as possible by bringing the respective outermost films of the optical fibers 400 into contact with each other. Here, N represents the number of terminals (the number of optical fibers 400) in the horizontal direction, and M represents the number of terminals (the number of optical fibers 400) in the vertical direction.

As described above, to obtain the maximum output of a laser beam source in Equation 1, it is desirable to distribute the transmission channels (Tx) so as to increase the arrangement length of the transmission channels (Tx) in the horizontal direction.

FIG. 6 illustrates a case where the transmission channels (Tx) are concentrated at the center in a case where the number N of terminals in the horizontal direction is set as an even number (=12). As described above, the output increases as the arrangement length of the transmission channels (Tx) in the horizontal direction is increased. In the arrangement example illustrated in FIG. 6, the transmission channels (Tx) has a minimum arrangement length D in the horizontal direction in an arrangement in which N is equal to 12 and M is equal to 2. The transmission channels (Tx) then have the lowest output in the arrangement. Further, in the example illustrated in FIG. 6, the calculated average area of the region in which the transmission channels (Tx) are arranged is too small for the connector arranged in the space provided between the optical fibers 400 that are adjacent to each other, resulting in the decreased output of the laser beam source. To obtain the maximum output of a laser beam source in Equation 1 described above, it is necessary to increase the arrangement length D of the transmission channels (Tx) in the horizontal direction.

Figure 7:
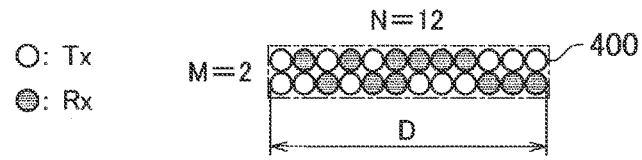
FIG. 7 is a schematic diagram illustrating an example in which an arrangement of the transmission channels (Tx) is extended in a horizontal direction as compared with FIG. 6.

FIG. 7 is a schematic diagram illustrating an example in which an arrangement of the transmission channels (Tx) is extended in the horizontal direction as compared with FIG. 6. In the example illustrated in FIG. 7, the arrangement length D of the transmission channels (Tx) is greater than that of FIG. 6. Accordingly, it is possible to increase the output of a laser beam source as compared with FIG. 6. It is possible to increase an alignment length D of the transmission channels (Tx), and the calculated average area of a region in which the transmission channels (Tx) are arranged, by, as illustrated in FIG. 7, distributing and arranging the transmission channels (Tx) and the reception channels (Rx) on the periphery of the region in which the transmission channels (Tx) and the reception channels (Rx) are arranged. According to the arrangement illustrated in FIG. 7, the transmission channels (Tx) occupy the maximum area in the possible arrangements. Accordingly, it is possible to obtain the maximum output level of a laser beam source. The same applies to FIGS. 8 to 11 below. According to the example illustrated in FIG. 7, the area (the area of the region surrounded by the one-dot chain in FIG. 7) occupied by the optical fibers 400 of the transmission channels (Tx) distributed and arranged on the periphery is larger than the occupied area (the area of the region surrounded by the one-dot chain line in FIG. 6) in a case where the optical fibers 400 of the transmission channels (Tx) are concentrated and arranged at the center of the arrangement region. This can increase the default value in the laser safety standard as the output level of a laser beam source. Accordingly, it is possible to obtain a larger margin for the bit error rate of transmission signals, and improves the transmission quality. It is thus possible to considerably improve the convenience of users.

Figure 9:
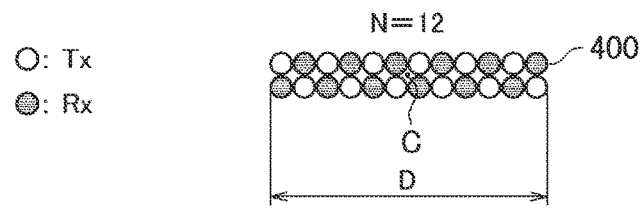
FIG. 9 is a schematic diagram illustrating an example in which an even number of transmission channels (Tx) and an even number of reception channels (Rx) are alternately arranged in the horizontal direction to make a staggered arrangement in the upper row and the lower row.
Figure 10:
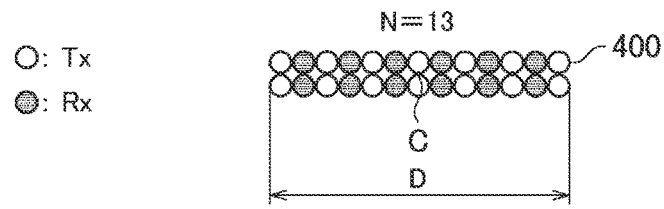
FIG. 10 is a schematic diagram illustrating an example in which the transmission channels (Tx) and the reception channels (Rx) are alternately arranged in the horizontal direction, and same channels are arranged in upper and lower rows in a vertical direction.
Figure 11:
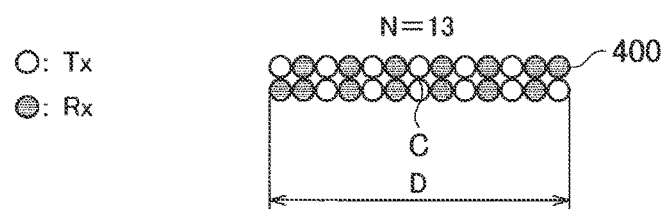
FIG. 11 is a schematic diagram illustrating an example in which, in a case where the transmission channels (Tx) and the reception channels (Rx) are alternately arranged in the horizontal direction, and same channels are arranged in the upper and lower rows in the vertical direction, different channels are arranged only in outermost upper and lower rows.

In such an alignment, the transmission channels (Tx) and the reception channels (Rx) are arranged in point symmetry to further free the up and down insertion direction in the vertical direction. This allows for a connection even in a case where the optical cable 300 is inserted to the connector units 102 and 202 upside down (rotated and inserted by 180 degrees). In view of this point, the optical fibers 400 of the transmission channels (Tx) are aligned in point symmetry in FIGS. 8 to 11 in a case where the number of terminals in the horizontal direction is an even number (N=12) (FIGS. 8 and 9) and in a case where the number of terminals in the horizontal direction is an odd number (N=13) (FIGS. 10 and 11). FIGS. 8 to 11 all illustrate an arrangement in which the transmission channels (Tx) has point symmetric about a center point C in the figure, and the transmission channels (Tx) have the maximum alignment length D in the horizontal direction.

Figure 8:
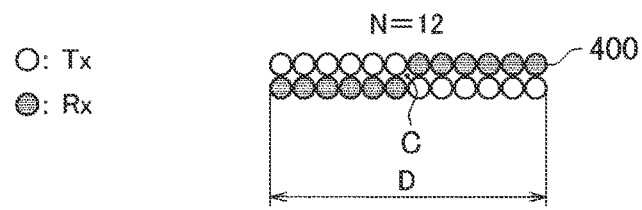
FIG. 8 is a schematic diagram illustrating an example in which halves of the transmission channels (Tx) are concentrated and arranged in an upper left row and a lower right row.

FIG. 8 illustrates an example in which the halves of the transmission channels (Tx) are concentrated and arranged in an upper left row and a lower right row. FIG. 9 illustrates an example in which an even number of transmission channels (Tx) and an even number of reception channels (Rx) are alternately arranged in the horizontal direction to make a staggered arrangement in the upper row and the lower row. FIGS. 8 and 9 have the same alignment length D in the horizontal direction, and the equivalent optical output can be thus obtained.

FIG. 10 illustrates an example in which the transmission channels (Tx) and the reception channels (Rx) are alternately arranged in the horizontal direction, and the same channels are arranged in upper and lower rows in the vertical direction. In this case, it is also possible to secure the maximum alignment length D in the horizontal direction. In the case of FIG. 10, the number of terminals in the horizontal direction is an odd number, and the transmission channels (Tx) that are two channels more than a necessary number of channels (twelve channels in this case) are arranged. The arrangement length D of the transmission channels is then greater than those of the cases of FIGS. 7 and 8. In the case of FIG. 10, in a case where the alignment of the transmission channels (Tx) is exchanged with the alignment of the reception channels (Rx), the transmission channels (Tx) and the reception channels (Rx) can be similarly arranged. However, in this case, the arrangement length D of the transmission channels (Tx) is slightly less than that of the case of FIG. 10.

FIG. 11 illustrates an example in which, in a case where the transmission channels (Tx) and the reception channels (Rx) are alternately arranged in the horizontal direction, and the same channels are arranged in the upper and lower rows in the vertical direction, different channels are arranged only in outermost upper and lower rows. In the case of FIG. 11, the reception channels that are two channels more than a necessary number of channels (twelve channels in this case) are arranged. The arrangement length D of the transmission channels (Tx) is then greater than those of the cases of FIGS. 8 and 9.

Additionally, in the alignment in which N is equal to 12 or N is equal to 13, and M is equal to 2, the arrangement examples illustrated in FIGS. 8 to 11 allow the transmission channels (Tx) to have the greatest arrangement length D. It is possible to increase the optical output more reliably than the arrangement illustrated in FIG. 6 as long as the alignment has the greater arrangement length D than that of FIG. 6. According to the arrangements illustrated in FIGS. 8 to 11, the transmission channels (Tx) thus occupy the maximum area in the possible arrangements, and it is then possible to obtain the maximum output level of a laser beam source.

According to the present embodiment, a user can thus connect the optical transmitting and receiving device 100 to the optical transmitting and receiving device 200 without paying any attention to the up and down direction of the optical connector units 102 and 202. Further, according to the present embodiment, it is possible to increase the output level (default value in the laser safety standard) of a laser beam source. Accordingly, it is possible to obtain a large margin for the bit error rate of transmission signals, and then improve the transmission quality. It is therefore possible to considerably improve the convenience of a user.

5. Modification of the Present Embodiment

Figure 12:
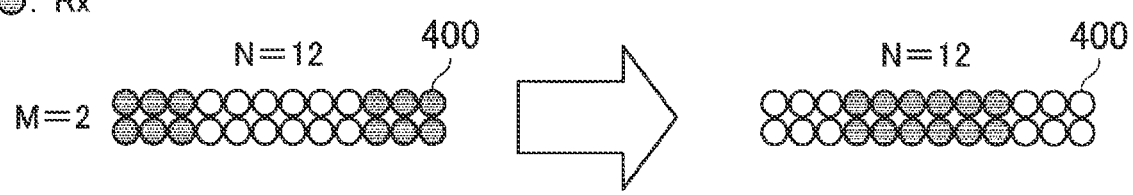
FIG. 12 is a schematic diagram illustrating a modification of terminal alignments of connector units 102 and 202 according to the present embodiment.

FIG. 12 illustrates a modification of terminal alignments of connector units 102 and 202 according to the present embodiment. Uncompressed video and audio data is, for example, assumed as data transmitted from the optical transmitting and receiving device 100 to the optical transmitting and receiving device 200 in the optical fiber system 1000 of FIG. 1. In this case, the transmission rate in the return channel from the optical transmitting and receiving device 200 to the optical transmitting and receiving device 100 is assumed for data transmission having an extremely lower transmission rate than that of the above-described uncompressed video and audio data. The terminal alignment as illustrated in FIG. 12 can be realized in such a system that has a non-target transmission rate depending on the transmission direction. Here, the alignment illustrated in the left part of FIG. 12 is similar to that of FIG. 6. The alignment illustrated in the right part of FIG. 12 has the transmission channels (Tx) arranged at both ends as compared with the alignment of FIG. 6. At this time, the transmission channels (Tx) of the optical transmitting and receiving device 100 arranged at both ends of the terminals may increase the output of a laser beam source and secure the margin of the above-described uncompressed video and audio data, and the output of a laser beam source for the return channels of the optical transmitting and receiving device 200 corresponding to the reception channels (Rx) arranged at the center of the terminals may be low.

As described above, according to the present embodiment, it is possible to increase the output level (default value in the laser safety standard) of a laser beam source. Accordingly, it is possible to obtain a large margin for the bit error rate of transmission signals, and then improve the transmission quality. It is therefore possible to considerably improve the convenience of a user. Further, according to the present embodiment, a user can connect the optical transmitting and receiving device 100 to the optical transmitting and receiving device 200 without paying any attention to the up and down direction of the optical connector units 102 and 202. Further, according to the present embodiment, it is thus possible to connect devices that perform optical transmission even if the direction of a connector is changed, and provide a terminal arrangement of a connector terminal capable of improving the transmission quality within safety standard restriction values required of a laser beam.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An optical connector including:

optical transmission paths that have end faces aligned in a predetermined region, and transmit optical signals, wherein the optical transmission paths correspond to transmission channels or reception channels, and the optical transmission paths of the transmission channels are distributed and arranged on a periphery of the predetermined region as compared with a case where the optical transmission paths of the transmission channels are concentrated and arranged at a center of the predetermined region.

(2)

The optical connector according to (1), wherein an area occupied by the optical transmission paths of the transmission channels which are distributed and arranged on the periphery of the predetermined region is larger than an area occupied by the optical transmission paths of the transmission channels in the case where the optical transmission paths of the transmission channels are concentrated and arranged at the center of the predetermined region.

(3)

The optical connector according to (1), wherein the optical transmission paths are arranged in N columns and M rows within the predetermined region.

(4)

The optical connector according to (3), wherein the optical transmission paths are arranged in the N columns and the M rows within the predetermined region, and the optical transmission paths of the transmission channels are arranged in 0 to N/2 columns and 0 to M/2 rows, and (N/2+1) to N columns and (M/2+1) to M rows, N representing an even number. M representing an even number.

(5)

The optical connector according to (3), wherein
the optical transmission paths are arranged in the N columns and two rows within the predetermined region, and the optical transmission paths of the transmission channels are arranged in 0 to N/2 columns in a first row, and (N/2+1) to N columns in a second row, N representing an even number.

(6)

The optical connector according to (3), wherein
the optical transmission paths of the transmission channels and the reception channels are alternately arranged.

(7)

The optical connector according to (6), wherein
N represents an even number, and the optical transmission paths of the transmission channels and the reception channels are alternately arranged in a row direction and a column direction.

(8)

The optical connector according to (6), wherein
N represents an odd number, the optical transmission paths of the transmission channels and the reception channels are alternately arranged in a row direction, and the optical transmission paths arranged in a given column in a column direction are any one of the transmission channels and the reception channels.

(9)

The optical connector according to (8), wherein
the optical transmission paths of the transmission channels and the reception channels are alternately arranged in columns at both ends in the column direction.

(10)

The optical connector according to (8), wherein
the optical transmission paths of the transmission channels are arranged in columns at both ends in the column direction.

(11)

The optical connector according to any of (1) to (10), wherein
outermost films of the optical transmission paths that are adjacent to each other are arranged in close contact with each other.

REFERENCE SIGNS LIST 102, 202 connector unit
400 optical fiber (optical transmission path)

The invention claimed is:

1. An optical transmitting and receiving device comprising:
an optical connector including optical transmission paths that have end faces aligned in a predetermined region, and transmit optical signals,
wherein the optical transmission paths comprise optical transmission paths of transmission channels and optical transmission paths of reception channels,
wherein the optical transmission paths of the transmission channels are distributed and arranged on a periphery of the predetermined region, and
wherein the optical transmission paths of the transmission channels and the optical transmission paths of the reception channels are alternately arranged in a column direction.

2. The optical transmitting and receiving device according to claim 1, wherein
an area occupied by the optical transmission paths of the transmission channels is larger than an area occupied by the optical transmission paths of the reception channels.

3. The optical transmitting and receiving device according to claim 1, wherein
the optical transmission paths are arranged in N columns and M rows within the predetermined region.

4. The optical transmitting and receiving device according to claim 3, wherein
the optical transmission paths are arranged in the N columns and the M rows within the predetermined region, and the optical transmission paths of the transmission channels are arranged in 0 to N/2 columns in 0 to M/2 rows, and (N/2+1) to N columns in (M/2+1) to M rows, N representing an even number, M representing an even number.

5. The optical transmitting and receiving device according to claim 3, wherein
the optical transmission paths are arranged in the N columns and two rows within the predetermined region, and the optical transmission paths of the transmission channels are arranged in 0 to N/2 columns in a first row, and (N/2+1) to N columns in a second row, N representing an even number.

6. The optical transmitting and receiving device according to claim 1, wherein
the optical transmission paths of the transmission channels and the optical transmission paths of the reception channels are alternately arranged in a row direction.

7. The optical transmitting and receiving device according to claim 6, wherein
N represents an even number.

8. The optical transmitting and receiving device according to claim 6, wherein
N represents an odd number, the optical transmission paths arranged in a given column in the column direction are any one of the transmission channels and the reception channels.

9. The optical transmitting and receiving device according to claim 8, wherein
the optical transmission paths of the transmission channels and the optical transmission paths of the reception channels are alternately arranged in columns at both ends in the column direction.

10. The optical transmitting and receiving device according to claim 8, wherein
the optical transmission paths of the transmission channels are arranged in columns at both ends in the column direction.

11. The optical transmitting and receiving device according to claim 1, wherein
outer films of the optical transmission paths that are adjacent to each other are arranged in proximate contact with each other.

12. The optical transmitting and receiving device according to claim 1, wherein when the optical connector transmits data, the data is outputted from only the optical transmission paths of the transmission channels distributed and arranged on the periphery of the predetermined region.

13. The optical transmitting and receiving device according to claim 1, further comprising:
a light emitting end; and
a light receiving end, wherein the light emitting end is an interface on which light is emitted toward the optical connector and the light receiving end is an interface on which light from the optical connector is received.

* * * * *